United States Patent [19]
Blackman

[11] Patent Number: 6,009,400
[45] Date of Patent: *Dec. 28, 1999

[54] METHOD AND ARRANGEMENT FOR ALERTING CUSTOMERS FROM PURCHASING PERISHED ITEMS USING BAR CODES WITH CHANGEABLE PROPERTIES WHEN SUBJECTED TO FACTORS CAUSING PERISHABILITY

[76] Inventor: Seymour Blackman, 5200 N. Ocean Dr., Apartment 1003, Singer Island, Fla. 33404

[*] Notice: This patent issued on a continued prosecution application filed under 37 CFR 1.53(d), and is subject to the twenty year patent term provisions of 35 U.S.C. 154(a)(2).

[21] Appl. No.: 08/611,053

[22] Filed: Mar. 5, 1996

[51] Int. Cl.$^6$ ............................. G09F 3/02; G06K 19/06
[52] U.S. Cl. ............................. 705/1; 422/56; 235/449; 235/462
[58] Field of Search ............................. 705/28, 29; 235/462, 235/449; 436/2; 250/219; 427/548; 374/102; 422/56

[56] References Cited

U.S. PATENT DOCUMENTS

| | | | |
|---|---|---|---|
| 3,662,181 | 5/1972 | Hercher et al. | 250/219 |
| 4,737,463 | 4/1988 | Bhattacharjee et al. | 436/2 |
| 5,045,283 | 9/1991 | Patel | 422/56 |
| 5,331,140 | 7/1994 | Stephany | 235/462 |
| 5,362,051 | 11/1994 | Swafford, Jr. et al. | 463/16 |
| 5,430,278 | 7/1995 | Krieg et al. | 235/449 |
| 5,480,685 | 1/1996 | Suzuki et al. | 427/548 |
| 5,602,377 | 2/1997 | Beller et al. | 235/462 |
| 5,667,303 | 9/1997 | Arens et al. | 374/102 |

FOREIGN PATENT DOCUMENTS

| | | |
|---|---|---|
| 4-306692 | 10/1992 | Japan . |
| WO 89/05761 | 6/1989 | WIPO . |
| WO 94/27144 | 11/1994 | WIPO . |

*Primary Examiner*—Eric W. Stamber
*Assistant Examiner*—M. Irshadullah
*Attorney, Agent, or Firm*—Kirschstein, et al.

[57] ABSTRACT

Retail establishment customers are prevented from unwittingly purchasing perishable items that may have been adversely affected by being subjected to at least one predetermined factor in that an identification object, such as a label, tag or packaging material, is provided with an initially machine-scannable bar code of such a character that its scannability is at least gravely impaired when the identification object is subjected to the predetermined factor. The identification object is secured to the respective item for both of them to be subsequently exposed to the same conditions such that a failed scan of the bar code occurring at the time of purchase alerts the customer to a previous occurrence among such conditions of the predetermined factor that may have adversely affected the item being purchased. In another aspect, a non-readable bar code is rendered readable by exposure to the predetermined factor, thereby alerting the customer.

7 Claims, 1 Drawing Sheet

METHOD AND ARRANGEMENT FOR ALERTING CUSTOMERS FROM PURCHASING PERISHED ITEMS USING BAR CODES WITH CHANGEABLE PROPERTIES WHEN SUBJECTED TO FACTORS CAUSING PERISHABILITY

BACKGROUND OF THE INVENTION

1. Field of the Invention

The present invention relates to consumer protection in general, and more particularly to a method of and an arrangement for alerting a customer to the possibility that particular perishable items being bought have been subjected to conditions that may have adversely affected their quality.

2. Description of the Related Art

There are already known various ways of informing customers at various retail establishments, such as department stores, grocery stores, drug stores and the like, about diverse attributes of the products on sale there. Some of that information, such as the name of the manufacturer and/or other information revealing the source of the goods, such as a trademark or brand name, is provided on a totally voluntary basis, usually as an enticement for the customer to purchase a particular product, to develop brand loyalty, and/or otherwise enhance the image of the manufacturer, while other information, such as a health hazard warning, nutritional information, or even an expiration date, may be provided on the products or their packaging at the prompting of authorities and/or because of legal requirements for providing such information.

There is still another type of informative material that can be almost invariably found on or in conjunction with products being on sale in retail stores or similar establishments, namely indicia providing at least the store personnel if not the consumer with information about the price of the product. Such indicia are provided, if not directly on, then on objects such as price tags or labels that are securely attached to, the products or the packages containing the same.

However, with the advent of widespread use of computer databases that include the latest product price information, whether such product is being offered at any particular time for at a regular price or at a temporarily reduced price, a new trend has emerged: reliance on the product identification itself, rather than any such indicia to determine the momentarily applicable price to be paid by the purchaser at the checkout counter for each particular item. Inasmuch as there are literally thousands upon thousands of different items being offered for sale even in any medium-size grocery store, for instance, and the prices of tens or possibly hundreds of them may change if not on a daily basis then from one week to the next one, it cannot and should not be expected from the store personnel to accurately remember or recall the momentarily applicable prices of all of such items. This is why the retail industry is heavily relying, more so than on, or even to the exclusion of, any price information that may be provided on the product itself or its packaging, on the so-called Universal Product Code (UPC) designation and particularly on the so-called UPC symbol that is a graphic representation of the UPC designation.

As is well known by now, this symbol in its simplest form consists of a series of bars and intervening spaces that differ from one another in their optical properties, with the bar regions being more light-absorptive than the intervening space regions and these widths and distribution of the bars corresponding to the numerical values to be represented thereby. The main if not only reason for presenting the UPC symbol in this form is that it is easily machine-readable, that is, it can be scanned by a simple scanner that passes a light beam (usually in the red or infrared range of the spectrum) over the symbol and converts the varying-intensity of the light returning to it after being redirected back from the bar code zone into electrical signals that represent, after possible further processing in the electric domain, the numeric or alphanumeric expression of the UPC. This expression of the UPC is then presented to the computer/database circuitry that looks up the price of the item on the basis of such expression and returns such price to the cash register for further processing thereat.

As useful as all of the aforementioned information associated with the product is either to the retail store owners or to the customers or to both, there is still one area that is not addressed by it, or at least not properly or reliably: namely, the history of the product between the time it was produced or put into the channels of commerce and the time that it is being purchased. Now, during such period, the product may have been subjected to certain conditions or factors that may have adversely affected its quality or wholesomeness or may have even made the product hazardous to the customer's health or well-being. This, coupled with the possibility that the purchaser may fail to check or notice the expiration date accompanying the product in one way or another if the product is of a perishable nature, as many processed and unprocessed foodstuffs are, results in a situation that the product may be purchased, without knowledge on the part of the purchaser and in most cases even the store owner or personnel, even though its integrity or other properties may have been impaired by intervening events.

OBJECTS OF THE INVENTION

Accordingly, it is a general object of the present invention to avoid the disadvantages of the prior art.

More particularly, it is an object of the present invention to provide a method of providing a prospective purchaser of perishable goods with important information, which method does not possess the shortcomings of the known methods of this type.

Still another object of the present invention is to devise an arrangement for performing the method of the present invention that is capable of alerting a potential purchaser of such goods about past events in the history of the product about to be purchased that may have adversely affected the quality of the product.

It is still another object of the present invention to develop the arrangement of the type here under consideration in such a manner as to be usable to record the occurrence of one or more of intervening events.

It is yet another object of the present invention to design the above arrangement in such a manner as to be essentially tamper-proof.

A concomitant object of the present invention is so to construct the arrangement of the above type as to be relatively simple in construction, inexpensive to manufacture, easy to use, and yet reliable in operation.

SUMMARY OF THE INVENTION

In keeping with the above objects and others which will become apparent hereafter, one feature of the present invention resides in a method of protecting retail establishment customers from unwittingly purchasing perishable items that may have been adversely affected by being subjected to at least one predetermined factor. This method involves providing an identification object with an initially machine-scannable bar code of such a character that its scannability is at least gravely impaired when the identification object is subjected to the at least one predetermined factor, and securing the identification object to the respective item for both of them to be subsequently exposed to the same conditions such that a failed scan of the bar code occurring at the time of purchase alerts the customer to a previous occurrence among such conditions of the at least one predetermined factor that may have adversely affected the item being purchased. A particular advantage of the method as described so far is that its use alerts the customer to the fact that the product to be purchased may have encountered the aforementioned "factor" in the past and may have suffered because of such encounter.

Many conditions qualify as such factor, from mere passage of time to exposure of the product to temperatures that are either too high or too low for that particular product, to variations or fluctuations in the temperature to which the product has been exposed, to exposure of the product to various kinds of radiation including light, especially light in the part of the spectrum that is not normally encountered at the location at which the product is on display in the store or on its route to that destination, exposure of the product to certain chemicals, etc. In accordance with the present invention, exactly what detrimental factor is to be looked for plays an important role in the decision how to perform the method in order to achieve the desired failure in scanning the bar code after the occurrence of the aforementioned predetermined factor.

In accordance with an advantageous facet of the present invention, the method includes forming on an exposed surface of the identification object a layer capable of accepting the bar code, and applying to the layer a pattern of bars and intervening spaces of different optical properties in correspondence with the applicable bar code in the form of an ink that cooperates with the layer in such a manner as to present an image of the pattern that is initially distinct but deteriorates when subjected to the at least one predetermined factor. The method then further includes choosing the layer and the ink in such a manner as to achieve sensibility to the factor to be watched out for. It is further advantageous when the inventive method includes providing in the layer a pattern of latent image regions corresponding in size and spatial distribution to the bar code and distinguished from surrounding and intervening regions of the layer by their capability of accepting the ink, and depositing the ink on the layer in such a manner as to permeate the latent image regions.

The present invention is also concerned with an arrangement for use in conjunction with an optical scanning device for protecting retail establishment customers from unwittingly purchasing perishable items that may have been adversely affected by being subjected to at least one predetermined factor. According to the present invention, such an arrangement includes an identification object securely attached to the respective item for both of them to be exposed to the same conditions subsequently to such attachment, and item identification means on the identification object, including a bar code being of such a character as to be initially scannable by the scanner but with its scannability being at least gravely impaired when the identification object is subjected to the at least one predetermined factor for a failure of a scan of the bar code performed by the scanner at the time of purchase to alert the customer to a previous occurrence among the aforementioned conditions of the at least one predetermined factor that may have adversely affected the item being purchased.

The aforementioned item identification means advantageously includes a layer on an exposed surface of the identification object capable of accepting the bar code, and a pattern of bars and intervening spaces of different optical properties in correspondence to the applicable bar code applied to the layer in the form of an ink that cooperates with the layer in such a manner as to present an image of the pattern that is initially distinct but deteriorates when subjected to the at least one predetermined factor.

It is also particularly advantageous in this respect when the aforementioned layer incorporates a pattern of latent image regions corresponding in size and spatial distribution to the bar code and distinguished from surrounding and intervening regions of the layer by their capability of accepting the ink for the latter to permeate the latent image regions on the layer. Of course, in this context as well, it is advantageous and proposed by the present invention to choose the material of the aforementioned layer and that of the ink in such a manner as to achieve the desired sensitivity to the condition event or, generally speaking, factor, the pre-purchase occurrence of which is to be tracked.

In another aspect, rather than impairing the scannability of the bar code, another feature of the present invention relates to affirmatively advising the customer that the product has encountered the aforementioned "factor" . For example, the identification object may be provided with a second bar code or indicia, in either machine—or human—readable form, that is only rendered readable to the machine or the customer when the identification object and the product to be purchased have experienced said factor, i.e., the passage of time or temperature minimum or maximum. This second indicia may be provided alongside or overlay the first bar code. There may be different types of the second indicia, each corresponding to a different factor. These different types may be applied on the identification object in advance, and then, if the object has experienced a particular factor, then only the corresponding type of the second indicia is rendered readable. If the indicia type is rendered visible to the customer, then the customer will have a positive, unambiguous warning or message that the product to be purchased has experienced a specific adverse condition. If the indicia type is rendered readable to a machine, then the machine can use this data to consult a look-up table stored either locally or in a remote location, retrieve the corresponding condition, and alert the customer or checkout operator at the point-of-sale site of the existence of said condition. This positive "diagnosis" of the condition of the product helps the customer make an informed decision about purchasing, and more usually, about not purchasing the product.

The novel features which are considered as characteristic of the invention are set forth in particular in the appended claims. The invention itself, however, both as to its construction and its method of operation, together with additional objects and advantages thereof, will be best understood from the following description of specific embodiments.

DETAILED DESCRIPTION OF THE PREFERRED EMBODIMENTS

Figure 1:
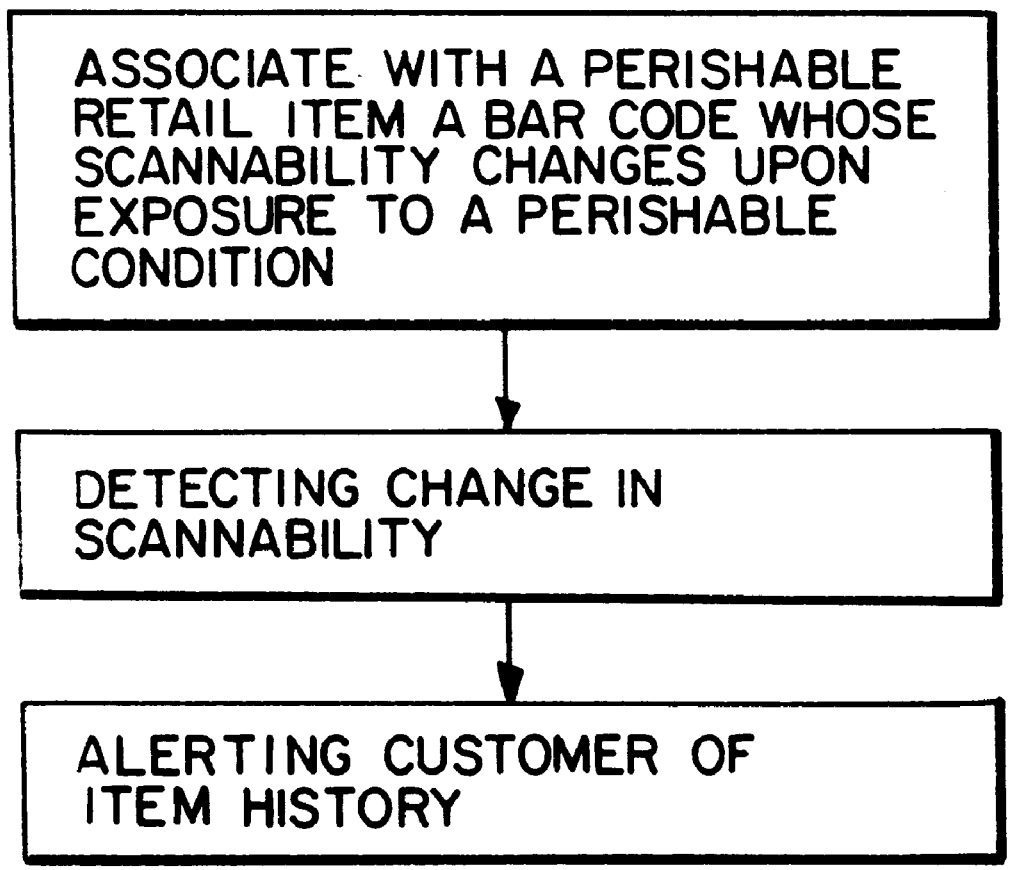
FIG. 1 is a flow chart according to the present invention.

As already alluded to before, the present invention generally relates to a system for using optical scanners for protecting customers by alerting them to certain pre-existing conditions in the history of a product that may have adversely affected the quality of the product. More particularly, this invention proposes the use of a bar-code scanner situated at a point of sale in a retail setting, whose primary if not only purpose in the past was to provide the cashier (or, to be more precise, the cash register) with information about the prices of the items being purchased, to prevent, or at least to alert the prospective purchaser of each particular item of the possibility of, an impending sale of a product that has already been scanned at least once before, whose expiration date has expired, that has been tampered with or adulterated in one way or another, that has been exposed to potentially harmful temperatures or temperature variations, or to harmful radiation, or to certain chemicals, etc.

As also mentioned before, many industries, possibly foremost among them the food processing industry and food distribution establishments such as grocery stores, supermarkets and the like, use a unique code (the aforementioned UPC designation and the corresponding symbol) for identifying the various products being ultimately offered for sale to the general public. The UPC symbol, as is well known, which is provided on or otherwise secured to the product itself or to its packaging, is characterized by a series or succession of bars and intervening spaces (hence the frequent reference to it as the "bar code"), with the bars having different widths and/or distributions depending on what numeric or alphanumeric values are to be represented by them, and optical properties differing from those of the intervening spaces and/or the surrounding regions.

Within the context of the present disclosure, the term "optical properties" will be used to denote solely the light absorptivity/reflectivity of the particular affected zone or region, be it the bar region of the space region, at least in the spectral range of interest for the scanning purposes, that is usually in the far red/near infrared range. While the absorptivity in the range of interest is all that matters as the scanning of the bar code is concerned, that is ordinarily not the only range in which the light absorptivity of the bars differs from that of the intervening spaces; as a matter of fact, the colors of (i.e. the intensities of light reflected or scattered at various wavelengths throughout the visible range of the visible spectrum from) the bars and spaces are typically different from one another, thus making the bar code visible even to a human observer, rather than just to the scanner. For maximum contrast between the bars and the intervening spaces, black ink (minimum light reflection) is currently preferred for the bars, printed or otherwise deposited on a white background (minimum light absorption).

When the particular item is to be checked out of the retail store or similar establishment equipped with the requisite scanning devices, a cashier positions or moves the item relative to the scanner (with either the item or the scanner performing the actual relative movement) in such a manner that a scanning beam generated by the scanner can sweep over the bar code. With the scanner activated, the intensity of the light reflected or scattered back to the scanner and detected thereat varies in dependence on whether it is a bar or an intervening space that is hit by the scanning beam at any particular time. This function that varies with the region illuminated by the scanning beam at any particular time and hence with the amount of time elapsed from the beginning of the particular scanning operation is then further processed in the electrical domain in that at least one photosensitive element intercepts such returning light and converts its varying intensity into a corresponding electrical signal that is then further processed and/or forwarded to a computer and/or an electronic database where a stored price for the product identified by such signal is retrieved and returned to the checkout counter or, to be more precise, to a cash register or computer terminal located thereat.

Of course, for this scanning process to work properly, it is imperative, among other things, that the bars and intervening spaces be, on the one hand, "visible" to the scanner in the first place, and on the other hand, that their respective optical properties within the operating range of the scanner differ from one another sufficiently for the scanner to be able to "tell the difference" between such bars and the intervening spaces. It is this requirement that is being utilized in accordance with the present invention to alert the customer, as well as the cashier and other store personnel, to the existence of a potential problem in the past history of the item being scanned at that particular time.

This is accomplished in accordance with the present invention by changing the characteristic optical properties of the bar code symbol or of at least one type of its constituent elements (bars or intervening spaces) as a function of something that is being referred to throughout this specification as a factor. Briefly stated, a "factor" is any condition which, if the product were subjected or exposed to it, would result in the deterioration in the quality of the product, possibly even to the point of spoilage when the product or item is perishable. The change taking place in such optical properties is of such a character as to tend to obliterate the differences between what the bars and the intervening spaces "look like" to the scanner, thus either fully negating the readability of the bar code to the scanner or at least so greatly impairing it that several scanning operations, that is several passes of the item by the scanner (or vice versa) would be required before the item would "register".

This failure to detect the bar code during the first scanning pass then constitutes an indication that would or should alert the consumer and also the store personnel that something is amiss with that particular item, and at least send them on a path of inquiry of what may have gone wrong with the product in the past. Of course, the mere fact that this event, i.e. the failure to properly scan the bar code of the particular product, had occurred gives no assurance that it will raise any alarm flags if the customer is unaware of its significance and if the store personnel, either out of ignorance or carelessness or with deceptive intent, discounts such significance or conceals it from the customer; moreover, even if it does, there is still no assurance that the customer or the checkout clerk will act on this information, i.e. investigate the reason why the scan had failed. Be it as it may, though, at least the customer is provided with an additional piece of useful information that was not provided prior to the present invention, and gets an opportunity to act on such information.

The present invention may be implemented, for example, by using a proprietary reusable paper and ink system marketed by the 3M Corporation under the name DATRIM® for the label, tag, layer, or, generally speaking, any substrate that is supposed to carry the bar code or UPC symbol. In this particular system, a latent image corresponding to the location of the bars is formed in the substrate. This latent image has affinity for at least certain liquids whereas the surrounding and intervening regions of the substrate do not, so that when a liquid substance referred to herein as ink is applied to the substrate, it will permeate the latent image regions and stay away from the intervening regions.

Now, the ink changes the appearance or color of the affected regions, because it fills microvoids present in such regions thus defeating the opacity previously provided by such microvoid and thus reveals the dark pigment or similar mineral substance that was previously concealed by such microvoids. The ink has a certain degree of volatility so that it will leave the substrate after a period of time the length of which can be chosen by selecting a substance with the requisite degree of volatility for the ink and by taking other measures, such as by applying an overcoat exhibiting low or non-existent vapor permeability, to range between just a few seconds and several years. While neither one of these extremes is usable or practical in the application proposed by the present invention, certain values in between ranging from several days to several months are well suited for the purposes of the present invention.

No matter what substance is chosen for the ink, the fact remains that at the beginning, right after the application of the ink to the substrate, there is revealed a sharp and crisp image of the desired pattern (bar code), but that the image will fade over time until a point is reached that the scanner is unable to read the bar code, this point corresponding to the predetermined expiration date for such product. However, the evaporation rate of the ink in this known system is or can be (by choosing an appropriate liquid substance for the ink) accelerated by the application to the product and thus to the substrate of temperatures that are elevated relative to that at which the particular product is supposed to be stored. This may be used to advantage with products such as prepackaged red meat, poultry, fish or the like that are supposed to be maintained in a frozen state until sold. Under these circumstances, the accelerated rate of evaporation of the ink and thus disappearance of the UPC symbol can be made to correspond to the rate at which the product would spoil at such elevated temperatures. Hence, relatively short exposure to such elevated temperature such as when a customer takes out the package to examine the meat or the like would hardly shorten the expiration period, whereas overnight electric blackout at the store might render the bar code illegible by the morning if that's all that it takes for the package contents to spoil.

In another currently contemplated embodiment of the present invention, the impingement of the scanning or laser beam on the symbol as it is being scanned for sale of the associated product to a customer is used as the factor rendering the UPC symbol unreadable to the scanner afterwards. In this instance, the ink is composed of a material which, when exposed to light at the operating wavelength of the scanning laser beam, changes its light absorptivity, self-destructs, flows or becomes otherwise invisible thus making the bars indistinguishable (at least at the operating wavelength of the scanner) from their surroundings and hence the symbol unreadable. Thus, in the event that it was attempted to pass the very same product through the checkout equipment again, be it because the product was already previously purchased by another customer and then returned, or because the store clerk had made a mistake and tried to scan the very same item a second time in the course of the same checkout operation, the unreadability of the code would once more alert both the customer and the store personnel to the existence of this factor or preexisting condition and make it possible for them to decide how to handle the situation. Thus, in the case a tamperer had tampered with the particular product, the next time an unsuspecting customer would attempt to buy the very same product, the latter would be stopped at the cash register. Also, by preventing another sale of a previously scanned (and hence presumably already charged for) product, it is avoided that an inattentive retail clerk could check such product through the checkout line more than once, thus again serving as a boon to consumers.

The factor the occurrence of which renders the bar code unreadable need not be the laser beam as such; rather, it may be any external condition to which the ink or the substrate, film or layer incorporating such ink is sensitive, for instance the elapse of a predetermined period of time as mentioned before. In this case, the ink may incorporate, or the regions of the substrate originally permeated by such ink may be overlaid with, a material which will change the optical properties of the symbol and especially its bar regions upon the elapse of a time interval from the application of the code that ideally extends all the way up to but does not continue beyond the stated expiration date of the product except when such product is subjected to abnormal temperatures or temperature excursions (whether they be above or below the desired temperature range at which the product is supposed to be stored), as also already mentioned before.

In this case, a rather slow polymerizing chemical can be employed either in the ink itself or in the material of the overlay; in the first instance, the polymerization may render the ink-permeated regions virtually indistinguishable from their surroundings in the end. In the second instance, the polymerized or almost completely polymerized material of, or incorporated in, the overlay may totally obstruct the view of the bar regions and/or of the adjacent space regions, thus once more making such regions optically indistinguishable from one another, at least as far as the scanning equipment is concerned. Other factors that can be detected is exposure of the product to humidity, to certain chemicals, its position or orientation during storage, handling and store display, or other mishandling of the product prior to being picked up by the purchaser.

Not only the optical properties of the ink, but also those of the background or matrix on which the ink is deposited and against which it is visible can be changed. The ink could be caused by the respective factor to be less absorptive, or the matrix less reflective, or both. Also, as alluded to before, not only the ink-containing regions (the bars of the symbol) but also the background or matrix (constituting the intervening spaces and surroundings of the bars) may be covered by an overlay that is sensitive to the predetermined factor and changes its optical properties in response to its occurrence such as to obscure both the ink regions and the matrix regions. The overlay may advantageously be constituted by an initially light-transmissive and preferably transparent film, sheet, strip or label that is applied over the symbol, with the material of such overlay changing its light absorptive/reflective properties when exposed or subjected to the aforementioned factor. Thus, for instance, heat may be applied to the overlay under some circumstances to render the overlay opaque either accidentally or by design.

Thus, it may be seen that the invention in its broadest sense, as depicted in FIG. 1 is directed to changing the spectral response (optical properties) of the bar code symbol imprinted on a matrix or substrate, be it the product itself, its packaging, or a label or tag secured to the product, so as to render the bar code unreadable to scanners after the product (and hence the bar code) has been exposed to at least one factor that may have adversely affected the integrity or quality of the product. The consumer, if heeding the warning, is thus protected from buying tampered-with products, resold products, expired products, improperly stored products or the like, all that by using various means for rendering the UPC symbols accompanying the products unreadable, particularly to bar code laser scanning point-of-sale equipment or systems.

In another sense, rather than impairing the scannability of the bar code, another feature of the present invention relates to affirmatively advising the customer that the product has encountered the aforementioned "factor". For example, the identification object may be provided with a second bar code symbol or indicia, in either machine—or human—readable form, that is only rendered readable to the machine or the customer when the identification object and the product to be purchased have experienced said factor, i.e., the passage of time or temperature minimum or maximum.

This second indicia may be provided alongside or overlay the first bar code. There may be different types of the second indicia, each corresponding to a different factor. These different types may be applied on the identification object in advance, and then, if the object has experienced a particular factor, then only the corresponding type of the second indicia is rendered readable.

If the indicia type is rendered visible to the customer, then the customer will have a positive, unambiguous warning or message that the product to be purchased has experienced a specific adverse condition. If the indicia type is rendered readable to a machine, then the machine can use this data to consult a look-up table stored either locally or in a remote location, retrieve the corresponding condition, and alert the customer or checkout operator at the point-of-sale site of the existence of said condition. This positive "diagnosis" of the condition of the product helps the customer make an informed decision about purchasing, and more usually, about not purchasing the product.

It will be understood that each of the elements described above, or two or more together, may also find a useful application in other types of constructions differing from the type described above.

While the present invention has been described and illustrated herein as embodied in some specific constructions of an arrangement for alerting customers to the past occurrence of certain conditions that may have had an adverse influence on the product, it is not limited to the details of this particular construction, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. A method of protecting customers from purchasing perishable items identified by bar code symbols thereon, comprising the steps of:
    a) providing indicia with an initially non-readable characteristic that is rendered readable after exposure to a temperature variation exceeding a predetermined range over a time period exceeding a predetermined threshold; and
    b) applying the indicia to, and out of physical contact with, the items; and
    c) warning the customers against purchase of items having indicia rendered readable solely by exposure of the indicia and the items to the temperature variation over the time period.

2. The method as defined in claim 1, wherein the indicia are respectively applied adjacent the bar code symbols on the items.

3. The method as defined in claim 1, wherein the indicia are respectively applied over the bar code symbols on the items.

4. The method as defined in claim 1, wherein the indicia is human-readable after exposure.

5. The method as defined in claim 1, wherein the indicia is machine-readable after exposure by an electro-optical scanner operative for reading the bar code symbols.

6. The method as defined in claim 5, wherein the scanner is operative for consulting a look-up table, retrieving information from the table, and alerting the customers of the retrieved information advising against purchase of the items.

7. The method as defined in claim 1, wherein the step of providing the indicia is performed by providing an ink, and wherein the step of applying the indicia is performed by applying the ink to the item in a pattern that becomes distinct only after said exposure.

* * * * *